May 12, 1959  W. D. CARRIE  2,885,886
PLASTIC FITTING TESTING DEVICE
Filed April 30, 1956  2 Sheets-Sheet 1

Inventor:
William D. Carrie.
By Joseph O. Lange
Atty.

May 12, 1959 W. D. CARRIE 2,885,886
PLASTIC FITTING TESTING DEVICE
Filed April 30, 1956 2 Sheets-Sheet 2

Inventor.
William D. Carrie.
By Joseph O. Lange
Atty.

United States Patent Office 2,885,886
Patented May 12, 1959

2,885,886
PLASTIC FITTING TESTING DEVICE

William D. Carrie, Lisle, Ill., assignor to Crane Co., Chicago, Ill., a corporation of Illinois Application April 30, 1956, Serial No. 581,704

8 Claims. (Cl. 73—37.5)

The present invention relates to apparatus for testing tubular plastic fittings for hose or pipe, or similar tubular articles of plastic, by internally applied fluid pressure, and more particularly to such apparatus which maintains the article tightly sealed during pressure application and indicates changes in shape of the article under such pressure.

The pressure testing of plastic fittings and the like heretofore has been restricted practically to determining the bursting pressure, because to date no satisfactory apparatus for observing and accurately measuring the effects of fluid pressure on a fitting during test has been provided. One typical way of testing such fittings, for example, is to enclose a fitting in a metal container strong enough to withstand the bursting pressure of the fitting, such as a length of pipe, and introduce testing fluid into the fitting. Obviously, while the bursting pressure of the fitting may thus be ascertained, no observation or accurate measurement of the inflation or distention of the fitting under pressure can be made. The present invention provides apparatus which not only measures and permits observation of fitting distention under any desired pressure, but assures tight sealing of the fitting to avoid escape of the testing fluid while providing for ready insertion and removal of the fitting. The illustrated embodiment of the invention comprises a frame including a base on which are supported fluid cylinder means to act against one end of a fitting or other article to be tested and a pair of uprights adjustably carrying a screw clamp member in opposition to the cylinder means to act against the other end of the article, which is thus clamped between the said member and the cylinder means, the latter having an effective area slightly greater than the area exposed to pressure within the article. Both the interior of the article and the cylinder means are supplied with fluid under pressure from a common source, so that the cylinder means are constantly urged against the article due to the pressure differential resulting from the difference in areas, and the ends of the article are thus kept securely sealed despite any shortening of the article, as from the effect of distention by the applied fluid pressure. A plurality of rods or posts are mounted on the base to extend about the article, each with a number of pins extending slidably therethrough to engage the exterior of the article. Distention of the article under pressure causes the pins to shift in accordance with the new contour of the article, their positions after the test indicating the amount and location of the distortion.

It is accordingly an object of the invention to provide apparatus for pressure testing tubular plastic fittings and like articles which allows full visual observation of an article under test.

Another object is the provision of pressure testing apparatus for tubular plastic fittings which indicates the degree and location of distention of an article under test.

Another object is the provision of pressure testing apparatus for tubular fittings and like articles of plastic which allows observation and measurement of the distention of an article under test at any desired pressure.

A further object is the provision of pressure testing apparatus for tubular fittings and like articles of plastic which maintains the test article tightly sealed despite shortening thereof due to distention under testing pressure.

Other and further objects of the invention will be apparent to those skilled in the art from the following description and the accompanying drawings, in which Fig. 1 is a plan view of apparatus according to this invention;

Fig. 3 is a fragmentary view, similar to the lower portion of Fig. 2, showing a somewhat different position of the apparatus resulting from distention of a test article therein.

Figure 1:
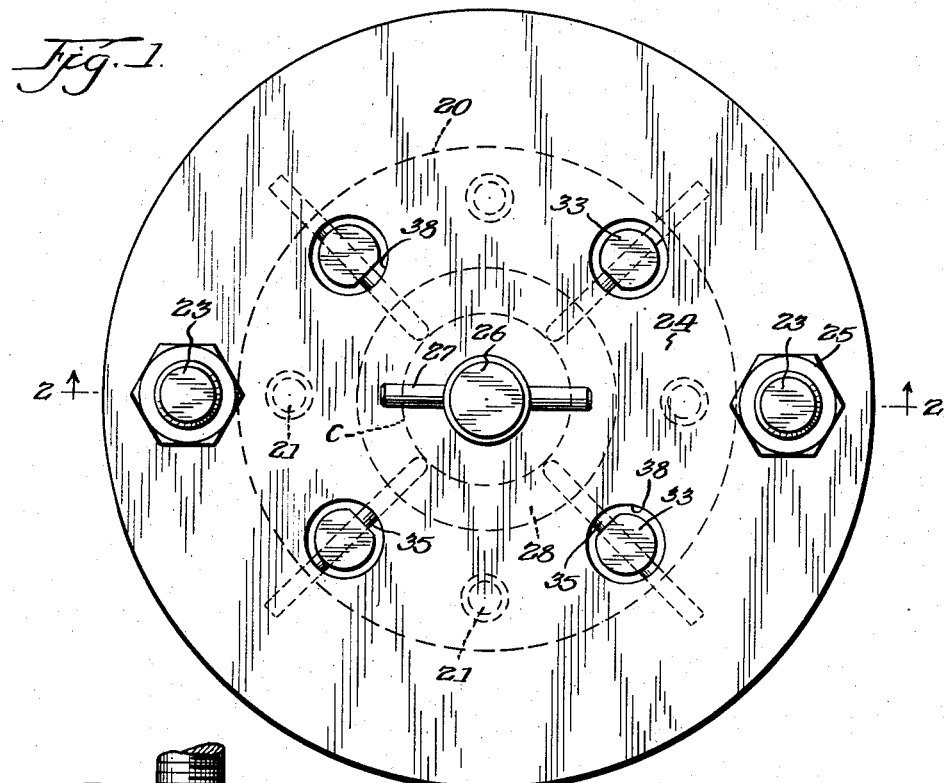
Figure 2:
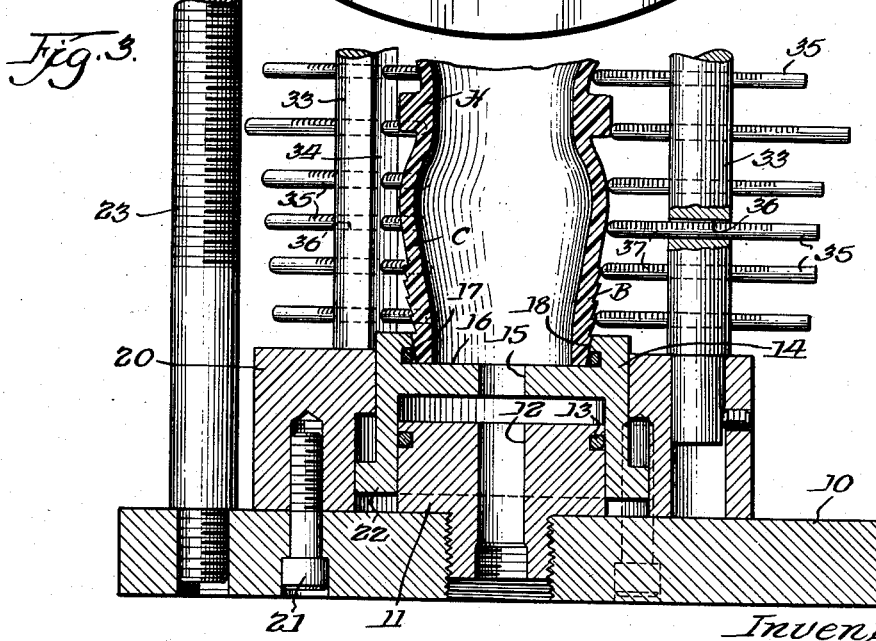
Fig. 2 is a vertical sectional view of the apparatus, taken approximately as indicated by the line 2—2 of Fig. 1.
Figure 2:
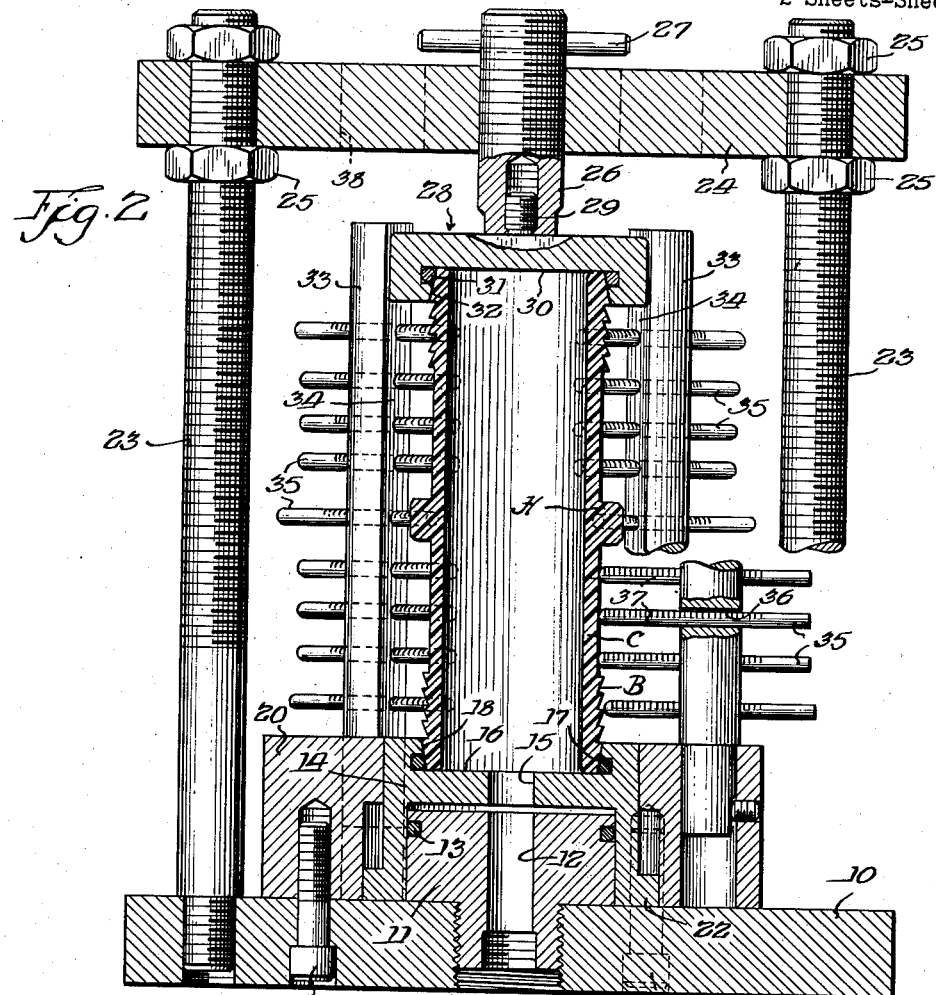

Referring first to Figs. 1 and 2 of the drawings, there is shown an apparatus comprising a base 10 on which is fixed a piston 11 having a passage 12 for pressure fluid extending axially therethrough and a circumferential groove holding an O-ring 13 for sealing a floating cylinder 14 reciprocable on the piston. The cylinder has an aperture 15 in its end wall to provide communication for the pressure fluid to the interior of a hollow cylindrical coupling C of plastic material, for example polyethylene, which has circumferential retaining barbs B at its ends and an enlarged hexagonal portion H at its center. The outer face of the cylinder end wall serves as a platform for the fitting and is formed to receive one end of the coupling in tightly sealed relation, by means of a recess or depression 16 having an undercut groove for an O-ring 17 and a peripheral wall portion 18 preferably coned or tapered in correspondence to the taper of the end barb B, and also of corresponding diameter. The end of the coupling C may thus be snugly received within the wall portion 18 and O-ring 17, with its interior communicating through the aperture 15 and the interior of the cylinder 14 with the piston passage 12 to receive test fluid under pressure. The area defined by the O-ring 17 on the outer face of the cylinder 14 subject to fluid pressure in the said coupling is slightly smaller than the effective area of the cylinder, or more precisely, since the area defined on the outer face of the cylinder is determined by the size of the coupling C, the cylinder is formed with an effective pressure area slightly greater than the pressure area defined on its outer end face by the sealing ring 17. A housing 20 is provided for the cylinder 14, removably fixed on the base 10 by cap screws 21 or the like, the housing being open at its upper end for reciprocation of the cylinder and lipped for engagement with a flange 22 or similar radially projecting means on the cylinder to limit travel of the cylinder outwardly of the housing. The piston fluid passage 12 is connected by any suitable conduit and valve means to a source of fluid under pressure; such means being well known, they are not here shown. It will be evident that if desired the housing 20 may be omitted, and means provided to limit movement of the cylinder 14 and prevent the possibility of accidental blowing thereof off the piston.

Fixed on the base 10 are a pair of uprights 23 parallel to the axis of the piston 11 and cylinder 14 and spaced from each other diametrically thereof. Supported on the uprights is a top plate 24 having a pair of apertures receiving the uprights therethrough so the plate may be moved to vertically adjusted position thereon. The uprights are threaded for cooperation each with a pair of nuts 25, one above and the other beneath the top plate, to secure the plate horizontally in desired vertically adjusted position. The top plate 24 has a central threaded aperture therethrough in which works a clamping screw 26 operated by a handle 27 or other suitable means. A clamping plate 28 is removably secured to the lower end of the screw 26 as by a stud 29 on its upper face threadedly engaged in a bore in the screw. The lower face of the plate 28 is formed similarly to the outer face of the cylinder 14 to receive in close sealing relation the end of the coupling C opposite that received by the cylinder, having a depression 30 with an undercut groove for a sealing O-ring 31 and a preferably tapered peripheral wall portion 32 for snug engagement with the end barb B of the coupling. As will be evident from Fig. 2, the top plate 24 is secured at a height above the housing 20 appropriate for insertion of the coupling C or similar fitting longitudinally between the cylinder 14 and the clamping plate 28 with its ends received in the depressions 16 and 30, and the plate 28 is then brought into engagement with the adjacent end of the coupling by means of the screw 26 so that the coupling is clamped between the cylinder and plate with sufficient pressure to insure tight sealing but is not appreciably compressed or deformed. When so positioned, the fitting is ready to receive pressure fluid for testing.

Figure 4:
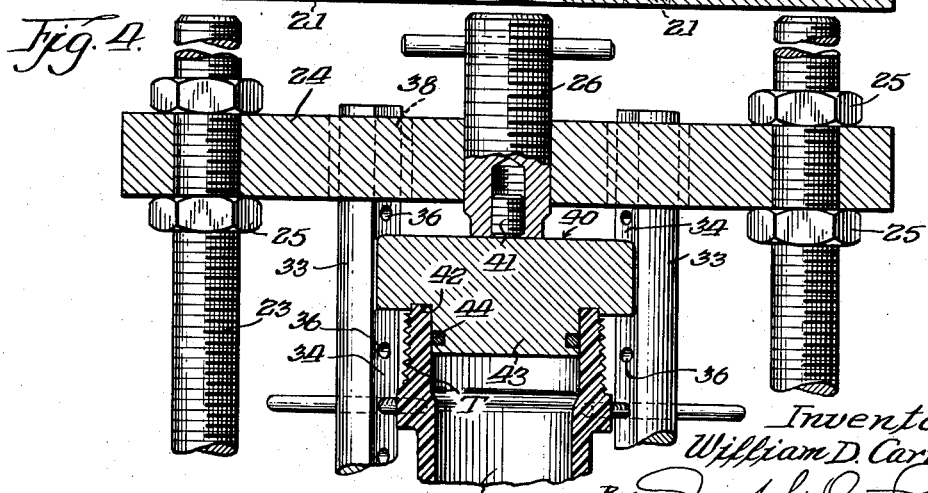
Fig. 4 is a fragmentary view similar to Fig. 2 showing the upper portion of the apparatus somewhat modified for use with a threaded article.

A number of rods or posts 33, in this case four, are provided paralleling the axis of the piston and cylinder, about the space occupied by the fitting. The posts are secured to the base 10, in this instance engaging suitable bores in the housing 20 and being held by set screws as shown. The lower right-hand portion of Fig. 2 has been taken on a section plane through one of the posts. The posts are of a length corresponding to the longest fitting which the apparatus is intended to accommodate, and are shown equally spaced from the coupling axis and from each other, although the spacing may vary as desired. Each post 33, whether of circular or other cross section, is formed with a flat face 34 adjacent the fitting, and a plurality of gauge pins 35 project through the post substantially normal to this face and generally radially of the fitting. The pins 35 are slidable in transverse bores 36 extending through the posts and longitudinally spaced therealong, the fit of the pins in the bores being such that while they may be moved readily, they will stay in place unless pushed or pulled. Graduations 37 are marked on the pins so that the distance each protrudes from the face 34 of its mounting post 33 may readily be noted. The top plate 24 has a plurality of apertures 38 therethrough located and sized to pass the posts 33 if the plate is lowered beyond the free ends of the posts, as shown in Fig. 4 by way of illustration. Of course, any suitable means for carrying the clamping plate in vertically adjustable relation may be substituted for the top plate 24.

In operation, after the coupling C or like fitting has been sealingly clamped in position as already described, the gauge pins 35, or such of them as it is desired to use, are brought into engagement at their inner ends with the outer surface of the coupling, and their positions relative to the flat faces 34 of the posts 33 as indicated by the graduated markings 37 are noted and recorded if desired. Testing fluid under pressure is then admitted to the coupling through the passage 12 in the piston 11 and aperture 15 in the end of cylinder 14, inflating or distending the coupling, and if sufficiently high causing it to burst. In distending, as will appear from Fig. 3, the coupling pushes radially outwardly those gauge pins 35 which engage the distended portion or portions, so that the distended contour of the coupling is indicated by the new positions of the pins. The displacement of the various pins may be ascertained by means of the graduations 37 thereon, read relative to the flat faces of the posts. Calipering or like measurements may of course be substituted for the use of the marking 37, if desired. It will be obvious that an accurate indication of the degree and location of expansion or distention of the coupling or other article is given by the gauge pins, and that such indications may be obtained at successively higher pressures until failure of the coupling, if the test is carried to bursting pressure. It will be noted from Fig. 3 that there is little if any deflection at the hexagonal portion H of the coupling, due to the mass of material provided thereby, and similarly the barbed end portions expand less than the intermediate portions. At all times, also, the coupling is open to visual observation in the apparatus. A transparent shield may be employed about the device to intercept any fluid ejected by bursting of the coupling, if desired. The effects of pressure on the coupling may thus be determined and the information employed to improve the material, design, or forming method, if advisable.

The bulging of the coupling under the internal pressure applied by the testing fluid results in a slight shortening of the coupling, as will be obvious. Such shortening, in the absence of means to compensate for it, would result in breaking of the seal at one end, or both, unless such great clamping pressure were initially applied to the coupling to avoid this as would compress or otherwise deform the coupling and thus invalidate the test. By the present invention, shortening of the fitting is compensated for and effective sealing maintained at all pressures without any distorting effect on the fitting. This is accomplished by the floating cylinder 14, which is urged constantly toward the clamping plate 28 by the differential pressure resulting from the excess of the effective area of the cylinder over the effective area of the means for receiving the end of the coupling. This differential is rather slight, so that there is no appreciable compressing action on the coupling tending to distort it, but sufficient to hold the cylinder closely against the end of the coupling and cause it to follow if there is any tendency of the coupling to shorten. The degree of shortening of the coupling C is shown considerably exaggerated in Fig. 3 for clearness.

The apparatus is adapted to accommodate couplings and other fittings of various diameters by the provision of a number of sets of pistons, cylinders, housings, and clamping plates, each dimensioned in accordance with a particular size of fitting. When the apparatus is to be changed to accommodate a fitting of a diameter other than that for which the apparatus has last been used, the housing 20 is removed, along with the cylinder 14 and piston 11, and these parts replaced by cooperating parts of the proper area to accommodate the fitting. The clamping plate 28 similarly is replaced by another of the proper dimensions.

The apparatus has been shown in Figs. 1 to 3 as arranged for operation on a coupling C which is barbed at both ends. Fittings of other types, such for example as adapters, are often threaded at least at one end, rather than barbed, and in such case a different means for receiving and sealing such threaded end must be employed. In Fig. 4, there is shown a portion of the apparatus employed for sealing an externally threaded end T of an adapter A. The apparatus is substantially identical to that already disclosed, with the exception of the clamping plate 28 which is replaced by a clamping plate 40 of somewhat different construction. The plate 40 is secured to the clamping screw 26 by a threaded stud 41 on its upper face substantially as in the case of the plate 28. In its opposite face is formed an annular groove 42 shallow enough to receive an extreme unthreaded part of the threaded end T of the adapter without damage to the threads. The central portion of this face is formed as a projection 43 which extends snugly into the interior of the adapter A, and has a peripheral groove carrying an O-ring 44 to provide a tight seal against the inner surface of the adapter. A seal which is safe and effective even at high pressures is thus provided. Although the construction employed for interior sealing of the threaded end of a fitting is shown in Fig. 4 as applied to the clamping plate, it will be clear that it might instead be employed on the outer face of the floating cylinder 14 so that the threaded end T would be received thereby, and the previously described clamping plate 28 employed for the other end of the fitting. If both ends of the fitting are externally threaded, the interior sealing construction would, of course, be employed on both the clamping plate and the cylinder 14.

In Fig. 4, the apparatus is shown as employed on a fitting, specifically the adapter A, which is appreciably shorter than the coupling C as shown in Fig. 2. Accordingly, the gauge pins 35 at the upper portions of the posts 33 have been removed and the plate 24 moved on the threaded uprights 23 to a position below the free ends of the posts 33, which are received in the apertures 38, so as to bring the clamping plate 40 into position for engagement with the end of the fitting upon operation of the screw 26.

It will be obvious that instead of introducing the testing fluid to the interior of the fitting through the passage 12 of the piston and the aperture 15 in the cylinder end, it may be introduced through a suitable aperture in the clamping plate 28 or 40, or by any other suitable means, the only requisite being that the fluid in the cylinder and that in the fitting be under the same pressure, as by being supplied from the same source.

Of course, other cylinder means than those specifically shown or other suitable fluid-operated expansible and contractible means, may be employed to provide the differential follow-up clamping pressure, if desired.

It will also be clear that instead of employing a clamping screw carrying the clamping plate 28 or 40 to sealingly clamp the fitting in testing position, the clamping plate may be secured in fixed relation to the top plate 24 and means provided for moving the cylinder 14 outwardly of the housing 20 to accomplish the preliminary clamping of the fitting. This might be done, for example, by making provision for introducing air or other suitable fluid under relatively light pressure into the space between the piston 11 and housing 20 below the flanged lower end 22 of the cylinder 14. This would require only a bore through the base 10 and suitable means for supplying fluid under pressure thereto from any convient source.

If fittings with only small differences in diameter are involved, sets of pistons, cylinder, housing, and clamping plate may be provided for only certain sizes of fittings, and adapted to accommodate a range of sizes by the provision of a number of interchangeable plates or like means, each formed to receive a particular size of fitting in the manner disclosed, for disposition on the cylinder and clamping plate. Each set thus may be used for fittings within a range of sizes limited only by the need to avoid excessive follow-up clamping pressure.

It will be apparent that the invention may be embodied in many other ways than as specifically disclosed herein, and it is not intended that it be limited to the illustrative disclosure made herein.

I claim:

1. Apparatus for pressure testing tubular plastic fittings and the like, comprising a support, a housing on said support, a piston fixed in the housing, a floating cylinder reciprocable in the housing and on the piston, a pressure fluid passage in the piston opening into the interior of said cylinder, an aperture in the cylinder end wall affording communication between the interior of the cylinder and a fitting to be tested, means on the outer face of the end wall sealingly receiving an end of such fitting defining an area about said aperture subject to fluid pressure in the fitting and smaller than the effective area of the cylinder, means in opposed relation to the cylinder for receiving the other end of such fitting, means for moving the cylinder and said opposed means relatively toward and from each other for clamping and releasing such fitting therebetween, a plurality of posts on said support generally parallel to the axis of the cylinder and piston disposed about the space occupied by such fitting in its test position each having a flat portion facing said space, a plurality of longitudinally spaced transverse bores through each post substantially perpendicular to the flat portion thereof, a plurality of gauge pins slidably disposed in bores of each post to engage the exterior of such fitting moveable in the bores by outward distention of such fitting under pressure, and means supplying fluid under pressure through said fluid passage of the piston to the interiors of said cylinder and such fitting.

2. Apparatus for pressure testing tubular members of plastic, comprising a support, a piston fixed on said support, a floating cylinder reciprocable on said piston, a pressure fluid passage through the piston opening to the interior of the cylinder, means supplying testing fluid under pressure to said passage, an aperture in the cylinder end wall affording passage for said fluid into the interior of a member to be tested, means on the outer face of the end wall for receiving an open end of such member in sealed relation defining an area subject to fluid pressure in the member smaller than the effective area of the cylinder, means in opposed relation to said receiving means for engaging such member in clamping relation, means for moving said receiving means and opposed means relatively toward and from each other to clamp and release such member therebetween, and gauge means on the support extending about the space occupied by such member including a plurality of pins slidably mounted substantially perpendicular to the axis of said cylinder and piston in longitudinally spaced relation therealong engageable with such member for outward movement by distention thereof under internal pressure to indicate the degree and location of distention.

3. Apparatus for pressure testing tubular members of plastic, comprising a support, fluid cylinder means on said support, platform means on said cylinder means for sealingly receiving an open end of a member to be tested and defining an area subject to fluid pressure in such member smaller than the effective area of the cylinder means, pressure fluid supply means common to the interiors of the cylinder means and such member, means in opposed relation to said receiving means for engaging such member in clamping relation, means for moving the receiving means and said opposed means relatively toward and from each other for clamping and releasing such member therebetween, and means mounted on said support engageable with the outer surface of such member at predetermined spaced points thereon and movable by distention of such member under internal pressure to substantially fixed positions for indicating degree and location of distention.

4. Apparatus for pressure testing tubular articles of plastic, comprising a support, fluid-operable extensible means on said support having platform means movable therewith, means on said platform means for receiving in sealed relation an open end of a tubular article to be tested defining on the platform means an area subject to fluid pressure in the article slightly smaller than the effective pressure area of said extensible means, means supplying testing fluid under common pressure to the interiors of said extensible means and such article, means in opposed relation to said receiving means for engaging a portion of such article opposed to said open end thereof, means for moving the receiving means and said opposed means relatively toward each other to clamp such article therebetween, and means mounted on said support engageable with the outer surface of such member at predetermined spaced points thereon and movable by distention of such member under internal pressure to substantially fixed positions for indicating degree and location of distention.

5. Apparatus for pressure testing tubular articles of plastic, comprising a support, fluid cylinder means on said support, means supplying testing fluid under pressure to the cylinder means for extension thereof, means on said cylinder means for receiving an open end of an article to be tested, said receiving means comprising a recess in the outer end face of the cylinder means of a depth to receive a portion of such article and of perimeter corresponding to that of the article end portion and having means therein to seal about the end portion defining an area slightly smaller than the effective area of the cylinder means, means placing the cylinder means in communication with the interior of such article, means in opposed relation to the receiving means for engaging a portion of such article opposed to said open end, means for moving said opposed means and receiving means relatively toward each other to clamp such article therebetween, and means mounted on the support engageable with the outer surface of such article at predetermined spaced points thereon and movable by distention of such article under internal pressure to substantially fixed positions to indicate distended contour of such article.

6. Apparatus for pressure testing tubular articles of plastic, comprising a support, fluid-operable extensible means on said support including platform means movable therewith, means on said platform means for receiving an open end of a tubular article to be tested, said receiving means comprising a recess in the outer face of the platform means of a depth accommodating an end portion of such article and perimetrally corresponding to such article end portion having means therein to seal about the end portion defining an area slightly smaller than the effective pressure area of the extensible means, means supplying testing fluid under common pressure to the interiors of the extensible means and such article, means in opposed relation to the receiving means for engaging a portion of such article opposed to said open end, means for moving said opposed means and receiving means relatively toward each other to clamp such article therebetween, and means mounted on the support engageable with the outer surface of such article at predetermined spaced points thereon and movable by distention of such article under internal pressure to substantially fixed positions to indicate distended contour of such article.

7. Apparatus for pressure testing tubular articles of plastic, comprising a support, fluid cylinder means on said support, means supplying testing fluid under pressure to the cylinder means for extension thereof, means on said cylinder means for receiving an end of an article to be tested and providing an area subject to fluid pressure in such article smaller than the effective area of the cylinder means, a member in opposed relation to said receiving means having means for engaging a portion of such article opposed to said end, at least one of said receiving means and engaging means comprising a relatively shallow groove accommodating an open end portion of such article with a central projection sealingly engaging within the open end portion, means providing communication between the interiors of such article and the cylinder means, means for moving the receiving means and opposed member relatively toward each other for clamping such article therebetween, and means mounted on the support engageable with the outer surface of such article at predetermined spaced points thereon movable by distention of such article under internal pressure to substantially fixed positions to indicate distended contour of such article.

8. Apparatus for pressure testing tubular articles of plastic, comprising a support, fluid-operable extensible means on said support having platform means movable therewith, means on said platform means for receiving an end of an article to be tested and providing an area subject to fluid pressure in such article smaller than the effective pressure area of the extensible means, a member in opposed relation to said receiving means having means for engaging a portion of such article opposed to said end, at least one of said receiving means and engaging means comprising a shallow groove accommodating an open end portion of such article with a central projection sealingly engaging within the open end portion, means supplying fluid under common pressure to the interiors of such article and the extensible means, means for moving the receiving means and opposed member relatively toward each other to clamp such article therebetween, and means mounted on the support engageable with the outer surface of such article at predetermined points thereon movable by distention of such article under internal pressure to substantially fixed positions to indicate distended contour of such article.

References Cited in the file of this patent

UNITED STATES PATENTS

| | | |
|---|---|---|
| 889,224 | Haas | June 2, 1908 |
| 1,973,674 | Rosenkranz | Sept. 11, 1934 |
| 1,989,680 | Carver et al. | Feb. 5, 1935 |
| 2,426,406 | Meyers | Aug. 26, 1947 |
| 2,671,273 | Barnes | Mar. 9, 1954 |

FOREIGN PATENTS

| | | |
|---|---|---|
| 809,857 | Germany | Aug. 2, 1951 |

OTHER REFERENCES

Publication, "Detecting Distortion Caused by Pressure," by Zeebroeck, American Machinist, March 19, 1931, page 476.